Figure 1:
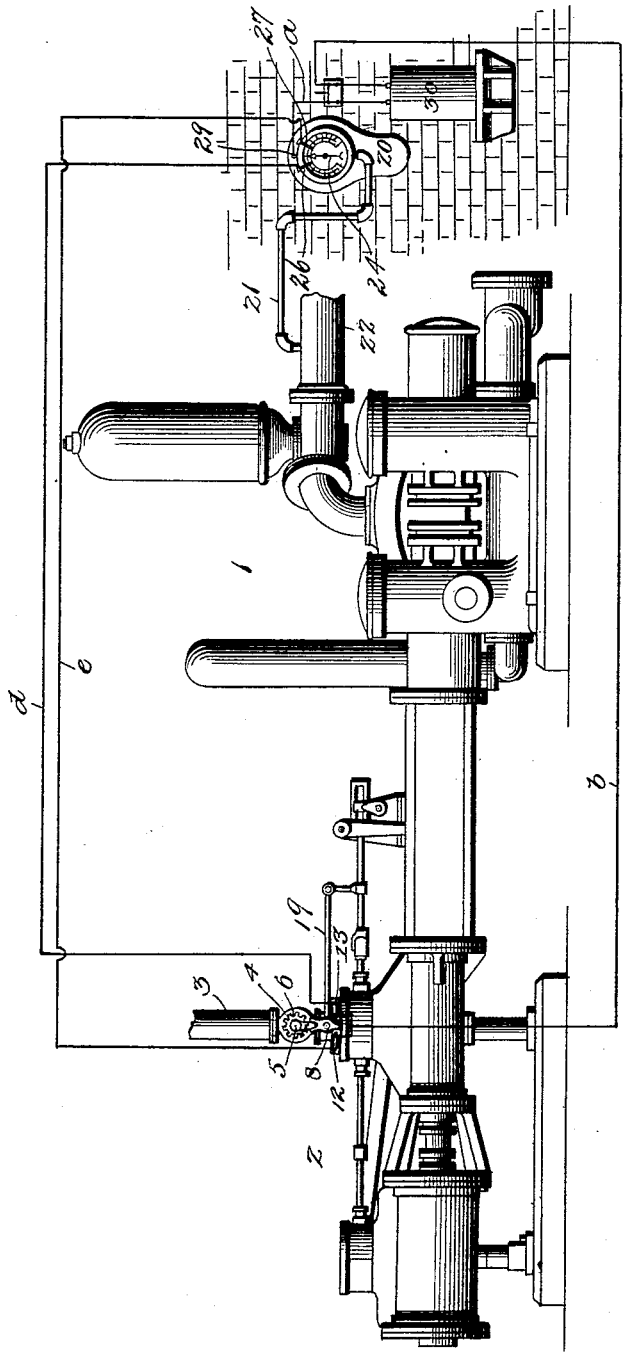

No. 702,872. Patented June 17, 1902.
P. H. HAMILTON.
FLUID PRESSURE REGULATOR.
(Application filed Dec. 20, 1901.)
(No Model.) 2 Sheets—Sheet 1.

Witnesses
Inventor
Paul H. Hamilton,
by W. C. Carman,
Attorney

No. 702,872. Patented June 17, 1902.
P. H. HAMILTON.
FLUID PRESSURE REGULATOR.
(Application filed Dec. 20, 1901.)
(No Model.) 2 Sheets—Sheet 2.

Witnesses
Inventor
Paul H. Hamilton
by H. C. Carman
Attorney

UNITED STATES PATENT OFFICE.

PAUL H. HAMILTON, OF YOUNGSTOWN, OHIO, ASSIGNOR OF ONE-HALF TO JOHN GOEPPINGER, OF YOUNGSTOWN, OHIO.

FLUID-PRESSURE REGULATOR.

SPECIFICATION forming part of Letters Patent No. 702,872, dated June 17, 1902.

Application filed December 20, 1901. Serial No. 86,662. (No model.)

*To all whom it may concern:*

Be it known that I, PAUL H. HAMILTON, a citizen of the United States, residing at Youngstown, in the county of Mahoning and State of Ohio, have invented certain new and useful Improvements in Fluid-Pressure Regulators; and I do hereby declare the following to be a full, clear, and exact description of the invention, such as will enable others skilled in the art to which it appertains to make and use the same.

This invention relates to fluid-pressure regulators or governors designed for automatically maintaining a fluid-pressure supply at a predetermined pressure through the medium of an automatic control of the motive-agent supply for the engine or motor which may be employed in connection with the fluid-pressure apparatus.

To this end the invention contemplates a simple, practical, and efficient automatic electrical fluid-pressure regulator comprising means for positively controlling the motive-agent supply in strict conformity with the pressure of the fluid being discharged from the fluid-pressure apparatus. In this connection the invention possesses special utility as an auxiliary to water-supply systems at a water-pumping station and may be effectually carried out by being operatively associated with the water or fluid pressure gage and the throttle or supply valve of the motive-agent or steam supply pipe, whereby fluctuations in the pressure of the water or fluid discharged from the fluid-pressure apparatus will directly affect the supply or amount of motive agent delivered into the engine or motor which operates the fluid-pressure apparatus or pump.

The invention also contemplates a novel construction and arrangement of parts whereby the regulator or governor may be set to control the operation of the apparatus according to any predetermined pressure, thus permitting the water or fluid to be supplied under different pressures, accordingly as it may be employed for domestic and manufacturing purposes or for fire-extinguishing and other uses.

With these and many other objects in view, which will more readily appear as the nature of the invention is better understood, the same consists in the novel construction, combination, and arrangement of parts hereinafter more fully described, illustrated, and claimed.

The essential features of the invention are necessarily susceptible to considerable modification or change, according to the particular character and construction of apparatus with which the same may be associated; but a preferred and practical embodiment of the invention is shown in the accompanying drawings, in which—

Figure 2:
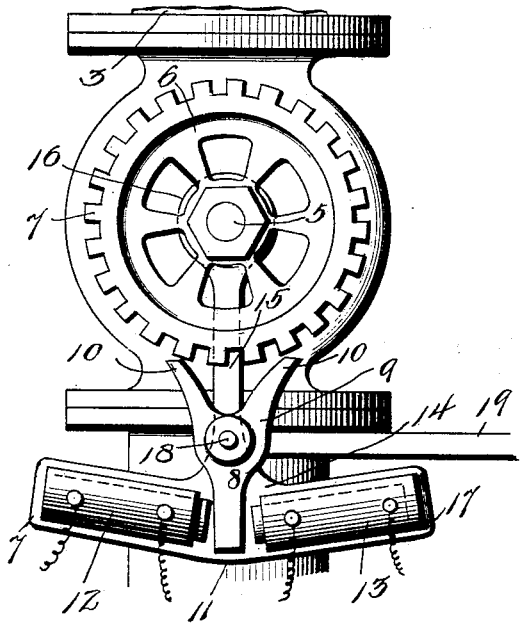
Figure 3:
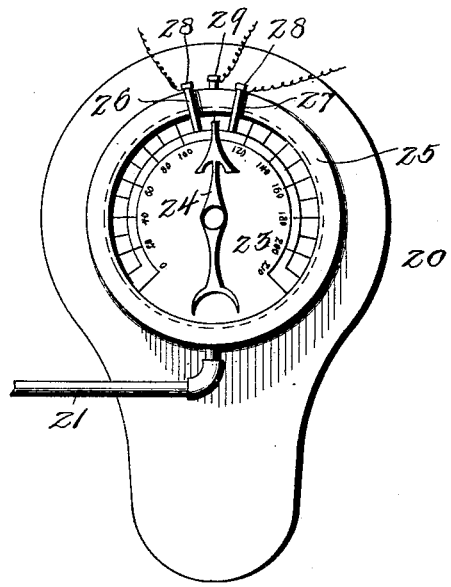
Figure 4:
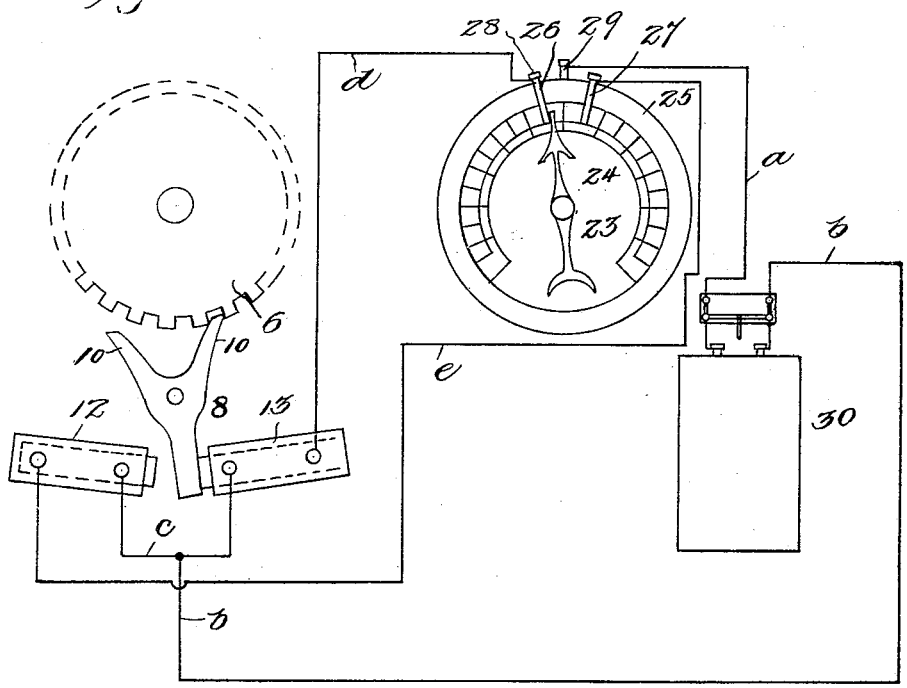

Figure 1 is a general view or side elevation of a steam-pumping apparatus such as is usually employed at a water-pumping station and shown equipped with pressure-regulating mechanism constructed and operated in accordance with the present invention. Fig. 2 is an enlarged detailed elevation of the valve-controlling device constituting a part of the regulating mechanism. Fig. 3 is a similar view of an ordinary form of pressure-gage modified for use as a pressure-operated circuit-controller to automatically and electrically throw the valve-controlling device in and out of action. Fig. 4 is a diagrammatic view of the entire regulating mechanism disassociated from the fluid-supply apparatus and showing more plainly a simple arrangement of wiring for carrying the invention into effect.

Like reference-characters designate corresponding parts in the several views of the drawings.

In adapting the invention for use the same is necessarily capable of general application to different types of fluid-pressure-supplying apparatus operated by a motor or engine; but as the regulating or governing mechanism possesses special utility as an auxiliary to a steam pumping apparatus at a water-pumping station it has been deemed sufficient for illustrative purposes to show the invention as applied to such use.

In the drawings the numeral 1 designates the fluid-pressure apparatus, which in the drawings is shown as an ordinary type of steam-pump operated by the usual steam engine or motor 2, which latter receives its supply of steam through the live-steam or motive-agent supply pipe 3. This motive-agent supply pipe 3 of the engine or motor which operates the water-pump is provided at a suitable point exterior to the steam chest or box with the ordinary cut-off-valve casing 4, within which is mounted a throttle-valve of any approved construction. The present invention contemplates no structural change in the throttle-valve nor any change in the functions thereof to provide for regulating the amount of steam-supply to the engine or motor, as any ordinary type of throttle or cut-off valve may have associated therewith the valve-controlling device forming a part of the present invention.

The valve-controlling device, which constitutes one part of the regulating or governing mechanism, is directly associated with the stem 5 of the throttle or cut-off valve and includes in its general organization a governing ratchet-wheel 6, arranged exterior to the valve-casing 4 and secured fast upon the outer end of the valve-stem 5 by any suitable fastening means. The governing ratchet-wheel 6 therefore occupies the same position and relation to the valve-stem 5 as the ordinary hand-wheel usually employed for operating the valve and may, in fact, be employed in the same manner as said hand-wheel when the regulating or governing mechanism is not in action.

The wheel 6 of the valve-controlling device is of the double-ratchet type, having the double-shouldered teeth 7, presenting shoulders at both sides thereof, whereby the wheel may be actuated or turned in either direction under the impulse of the actuating-pawl 8, which also is an element of the valve-controlling device. This actuating-pawl 8 is necessarily of a duplex type to properly coöperate with the double-ratchet wheel 6 and in its preferable construction essentially consists of a forked body 9, having the oppositely-extending divergently-disposed points 10 and a pendent adjusting-stem 11, coöperating with electromagnets 12 and 13 to provide for setting the pawl to either of its active positions, according to the direction in which it may be necessary for the throttle-valve to turn. By reason of the structural formation of the pawl, as described, the same may be properly termed an "approximately Y-shaped" pawl, with the stem portion 11 thereof constituting an armature playing between the opposing exposed core ends of the magnets 12 and 13. The approximately Y-shaped actuating-pawl 8 and the pawl-setting magnets 12 13, coöperating therewith to adjust its position, maintain a constant operative relation and are preferably carried or supported by a common support 14, which may be termed a "pawl-carrier," inasmuch as it not only supports the pawl, but also provides for imparting the necessary motion thereto to secure the rotation of the double-ratchet wheel 6 in either direction. The pawl-carrier 14 is preferably in the form of a swiging bracket, essentially consisting of a hanger-arm 15, having a pivotal support at its upper end, as at 16, upon the valve-stem 5 or any fixed bearing-support upon the exterior of the valve-casing 4, as any suitable expedient may be resorted to for pivotally suspending the hanger-arm 15 of the bracket or carrier 14. In addition to the pendent swinging hanger-arm 14 the pawl-carrier also preferably includes the oppositely-extending bracket members 17, projecting from the arm 15 upon opposite sides and at the lower end thereof, said bracket members 17 constituting suitable bases or supports upon which are mounted the spaced oppositely-arranged electromagnets 12 and 13. The pawl 8 occupies a central or intermediate position with reference to the magnets 12 and 13 and is pivotally mounted intermediate its ends upon the hanger-arm 15 by the pivot 18, said pivot being located at a point between the forked portion of the pawl-body and the adjusting or armature stem 11 thereof. Normally when both of the magnets 12 and 13 are deënergized the pawl 8 centers itself with both of its points 10 out of engagement with the teeth of the ratchet-wheel 6, thus exerting no influence upon the throttle or cut-off valve, and at this point it is to be noted that the pawl-carrier 14 is designed to be continuously operated from a moving part of the engine or motor, preferably through the medium of an operating or motion rod connection 19 with the valve-stem of the engine or motor, said rod connection 19 being also conveniently made with the pawl-carrier 14 at the pivotal support of the pawl 8. The magnets 12 and 13 are designed to be separately energized and deënergized, according as the conditions of the apparatus may demand, and are respectively intended to set the pawl 8 to a position for either opening or closing the throttle-valve, and for convenience in understanding the action of the mechanism the electromagnet 13 may be referred to as the "opening-magnet" and the other magnet 12 as the "closing-magnet" for the valve. To provide for automatically rendering the magnets active and inactive, the ordinary pressure-gage is utilized as a circuit-controller, having suitable wire connections with the magnets and also with the source of electrical energy. The pressure-gage 20 has the usual pressure-pipe connection 21 with the discharge or outlet pipe 22 of the fluid-pressure apparatus or pump, whereby the pressure of the fluid being discharged will be indicated upon the dial of the gage 20. This gage comprehends the usual interior gage mechanism and includes in its general organization the exterior dial 23, having the usual numbered graduations thereon indicating the pressure in pounds. The gage also includes the pointer or indicator 24, swinging over the face of the dial, and a rim member 25. In the present invention this rim member is designed to be movable or turnable about the dial 23 and constitutes an adjustable support for a pair of spaced contacts 26 and 27, respectively. These contacts 26 and 27 are attached to the movable or adjustable rim 25 in any suitable manner and are insulated from each other, as well as from the adjustable support or rim 25. The said spaced contacts 26 and 27 have their end portions extending over the edge of the dial 23 in the path and respectively upon opposite sides of the tip of the pointer 24, so as to coöperate with the latter in the opening and closing of the circuits. The said spaced contacts 26 and 27 are provided with suitable binding-posts 28 for the wire connections, and there is also a binding-post 29 in metallic connection with the rigid portion of the frame or casing of the gage, which frame or casing is also in metallic connection with the pointer or indicator 24, whereby the said binding-post 29 may be maintained in an electrical circuit with the pointer or indicator 24.

Any suitable circuit-wiring may be utilized in carrying out the invention. However, for illustrative purposes the wiring is shown in the simplest way. Referring particularly to the diagrammatic illustration of Fig. 4, the reference-number 30 designates a battery or other source of electrical energy, one of the poles of which has a wire connection $a$ with the binding-post 29 for the pointer or indicator 24. The other pole of the battery or source of electrical energy may conveniently have a common return-wire connection $b$ therewith, said return-wire connection being looped by the loop-wire $c$ with one pole or terminal of both the closing and opening magnets 12 and 13. The other pole or terminal of the magnet 12 has a circuit-wire connection $e$ with the contact 27, and the other pole of the magnet 13 has a corresponding wire connection $d$ with the other contact 26.

From the foregoing it is obvious that any fluctuations beyond a normal predetermined pressure will carry the tip of the pointer or indicator 24 against either of the contacts 26 or 27, and thus close an electrical circuit through either of the magnets 12 or 13, with the consequence of automatically setting the pawl to an operative position for turning the ratchet-wheel in the proper direction, according as the valve should be opened farther or closed. In the event of pressure becoming abnormal the pointer will move against the contact 27, thereby completing an electrical circuit over the wire $a$, binding-post 29, pointer 24, contact 27, wire $e$, magnet 12, wire $c$, wire $b$, and battery 30. The completion of this circuit throws the pawl to a position for turning the valve to the right, and the motion of the rod connection 19 will provide for turning the ratchet-wheel sufficiently to cut off or reduce the motive-agent supply until the pressure again becomes reduced to a normal condition, whereupon the pointer falls away from the contact 27 and breaks the electrical circuit, thus permitting the pawl 8 to again assume an inactive position with reference to the ratchet-wheel 6. The reverse action takes place if the pressure lowers below the predetermined degree, as in such case the pointer moves against the contact 26, as shown in Fig. 4, and closes the circuit through the magnet 13, thus setting the pawl to act or operate in the opposite direction—that is, for opening up the throttle-valve and increasing the motive-agent supply—until the pressure reaches the proper degree.

Whenever it is desired to set the apparatus to operate at different pressures according to any particular requirement, it is simply necessary for the operator to turn the movable rim 25 until the spaced contacts 26 and 27 are disposed, respectively, at opposite sides of the degree of pressure which may be determined upon as the normal pressure. This adjustment of the movable rim also necessarily carries the pointer or indicator around the dial to the particular graduated portion over which it may be desired for the same to play. The simultaneous adjustment of the pointer or indicator and the spaced contacts is necessarily occasioned by the tip or end of the pointer lying between and in interfering relation to the contacts 26 and 27, which are fitted to and carried with the movable rim.

From the foregoing it is thought that the construction, operation, and arrangement of parts will be readily apparent without further description, and it will be understood that various changes in the form, proportion, and minor details of construction may be made within the scope of the invention without departing from the spirit or sacrificing any of the advantages thereof.

Having thus described the invention, what is claimed, and desired to be secured by Letters Patent, is—

1. In a fluid-pressure regulator, the combination with a fluid-supply apparatus having a fluid-supply valve for the motive agent, of a valve-controlling device comprising a ratchet-wheel mounted upon the valve-stem, a movable pawl-carrier operated from a moving part of the engine or motor, a pawl supported upon the carrier, and an electrical pawl-setting device also carried by the carrier, and a pressure-operated circuit-controller.

2. In a fluid-pressure regulator, the combination with a fluid-supply apparatus having a supply-valve for the motive agent, of a valve-controlling device comprising a double-ratchet wheel mounted upon the valve-stem, a movable pawl-carrier operated from a moving part of the engine or motor, a normally inactive double-acting pawl mounted upon the carrier, separate setting-magnets coöperating with the pawl and also mounted upon the carrier, and a pressure-operated circuit-controller.

3. In a fluid-pressure regulator, the combination with a fluid-supply apparatus having a supply-valve for the motive agent, of a valve-controlling device comprising a double-ratchet wheel mounted upon the valve-stem, a pendent swinging carrier pivotally supported and operated from a moving part of the engine or motor, an approximately Y-shaped actuating-pawl pivotally mounted upon the carrier and having a pendent armature-stem portion, pawl-setting magnets mounted upon the carrier respectively at opposite sides of the said armature-stem portion of the pawl, and a pressure-operated circuit-controller in circuit with said magnets.

4. In a fluid-pressure regulator, the combination with a fluid-supply apparatus having a supply-valve for the motive agent, of a valve-controlling device including pawl-and-ratchet members and pawl-setting magnets, and a pressure-operated circuit-controller consisting of a pressure-gage having a pointer and spaced contacts disposed respectively at opposite sides of the pointer, the latter and said contacts being included in circuit with a source of electrical energy and said magnets.

5. In a fluid-pressure regulator, the combination with a fluid-supply apparatus having a supply-valve for the motive agent, of a valve-controlling device including pawl-and-ratchet members and separate setting-magnets for the pawl member, and a pressure-operated circuit-controller consisting of a pressure-gage having a pointer and separate spaced contacts for the separate magnets, said pointer and contacts constituting a circuit-closer and being included in an electrical circuit with a source of energy and said magnets.

6. In a fluid-pressure regulator, the combination with a fluid-supply apparatus having a supply-valve for the motive agent, of a valve-controlling device including electromagnetic operating means, and a pressure-operated circuit-controller in circuit with said electromagnetic operating means and consisting of a pressure-gage having a movable adjustable rim, and a pair of spaced contacts carried by said rim and extending over the dial respectively at opposite sides of the indicating end of the pointer, the latter and the said contacts being included in the electrical circuit.

In testimony whereof I affix my signature in presence of two witnesses.

PAUL H. HAMILTON.

Witnesses:
ORVAN E. BARKER,
JOHN S. WILLIAMS, Jr.